(12) United States Patent
Chiba et al.

(10) Patent No.: US 7,676,056 B2
(45) Date of Patent: Mar. 9, 2010

(54) METHOD AND APPARATUS FOR DETERMINING ENCODING AVAILABILITY, AND COMPUTER PRODUCT

(75) Inventors: Hirotaka Chiba, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1044 days.

(21) Appl. No.: 11/320,937

(22) Filed: Dec. 30, 2005

(65) Prior Publication Data

US 2007/0071281 A1 Mar. 29, 2007

(30) Foreign Application Priority Data

Sep. 26, 2005 (JP) .............................. 2005-278572

(51) Int. Cl.
 *G06K 9/00* (2006.01)
(52) U.S. Cl. .................. 382/100; 713/176; 348/460
(58) Field of Classification Search ................. 382/100, 382/232, 236–242; 380/210, 252, 287, 54; 713/176; 704/200.1, 273; 381/73.1; 348/460, 348/463
See application file for complete search history.

(56) References Cited

U.S. PATENT DOCUMENTS

| | | | | |
|---|---|---|---|---|
| 5,636,292 | A | | 6/1997 | Rhoads .................. 382/232 |
| 5,841,978 | A | | 11/1998 | Rhoads .................. 395/200.47 |
| 6,049,627 | A | * | 4/2000 | Becker et al. .............. 382/181 |
| 6,456,727 | B1 | * | 9/2002 | Echizen et al. ............. 382/100 |
| 6,522,766 | B1 | | 2/2003 | Ratnakar |
| 6,600,828 | B1 | | 7/2003 | Kawamura |
| 6,603,864 | B1 | * | 8/2003 | Matsunoshita ............. 382/100 |
| 6,707,465 | B2 | * | 3/2004 | Yamazaki et al. .......... 345/629 |
| 7,072,493 | B2 | * | 7/2006 | Venkatesan et al. ........ 382/100 |
| 7,260,239 | B2 | * | 8/2007 | Eguchi ..................... 382/100 |
| 2003/0156644 | A1 | | 8/2003 | Song et al. |
| 2004/0234139 | A1 | | 11/2004 | Moroo et al. |
| 2004/0247155 | A1 | * | 12/2004 | Eguchi ..................... 382/100 |
| 2007/0071281 | A1 | * | 3/2007 | Chiba et al. ................ 382/100 |

FOREIGN PATENT DOCUMENTS

| | | |
|---|---|---|
| EP | 1 363 236 | 11/2003 |
| EP | 1 394 738 | 3/2004 |
| EP | 1 480 163 | 11/2004 |
| JP | 8-204943 | 8/1996 |
| JP | 2000-299779 | 10/2000 |
| JP | 2003-209681 | 7/2003 |
| JP | 2003-348553 | 12/2003 |
| JP | 2004-349879 | 12/2004 |
| JP | 2005-117154 | 4/2005 |

OTHER PUBLICATIONS

Office Action issued in corresponding Japanese Patent Application No. 2005-278572, mailed on Nov. 13, 2007.

* cited by examiner

*Primary Examiner*—Anand Bhatnagar

(57) ABSTRACT

An embedding-availability determining unit determines an availability of embedding data into an image based on an input/output characteristic of a predetermined feature amount related to a combination of an output device that outputs an image in which the data is embedded to a medium and an input device that inputs the image that is output to the medium. A result output unit outputs a result of determination by the embedding-availability determining unit.

20 Claims, 14 Drawing Sheets

FIG.3

(A) WHEN $D_l < D_r$ $$D'_l = (D_l + D_r)/2 - T/2 \quad (1)$$
$$D'_r = (D_l + D_r)/2 + T/2 \quad (2)$$

(B) WHEN $D_l \geqq D_r$ $$D'_l = (D_l + D_r)/2 + T/2 \quad (3)$$
$$D'_r = (D_l + D_r)/2 - T/2 \quad (4)$$

$D'_l$: LEFT-SIDE AVERAGE DENSITY DATA AFTER MODIFICATION
$D'_r$: RIGHT-SIDE AVERAGE DENSITY DATA AFTER MODIFICATION
$D_l$: LEFT-SIDE AVERAGE DENSITY DATA BEFORE MODIFICATION
$D_r$: RIGHT-SIDE AVERAGE DENSITY DATA BEFORE MODIFICATION
T: DIFFERENCE MAINTAINED FOR EACH BLOCK

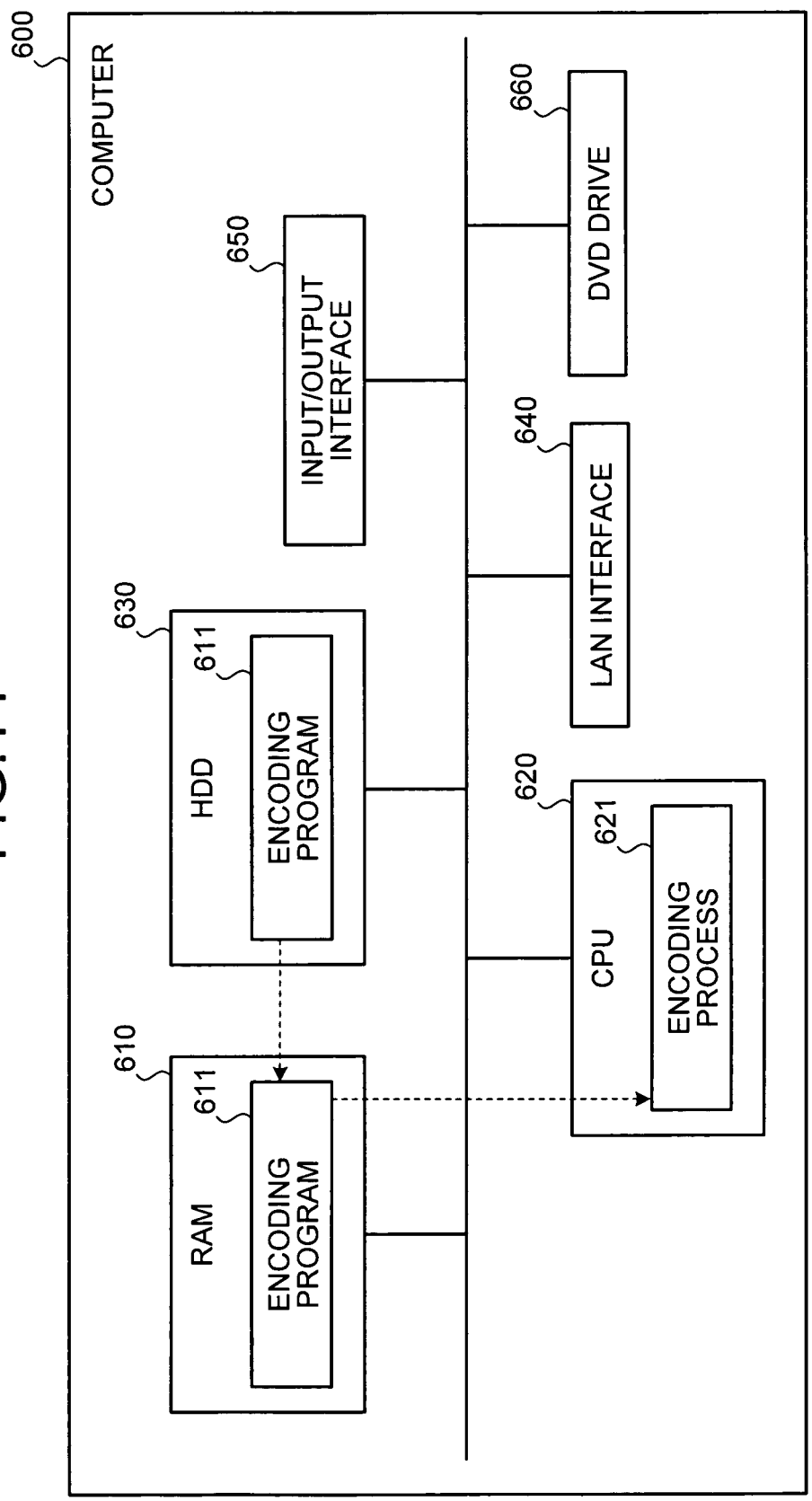

METHOD AND APPARATUS FOR DETERMINING ENCODING AVAILABILITY, AND COMPUTER PRODUCT

BACKGROUND OF THE INVENTION

1. Field of the Invention

The present invention relates to an encoding-availability determining apparatus, an encoding-availability determining method, and an encoding-availability determining program that determine whether encoding can be performed to embed data into an image, and more particularly to an encoding-availability determining apparatus, an encoding-availability determining method, and an encoding-availability determining program that enable to determine whether encoding can be performed without actually examining whether data can be extracted from an image by inputting the image from a medium after the image having encoded data is output to the medium.

2. Description of the Related Art

A conventional technology disclosed in U.S. Pat. No. 5,636,292 and Japanese Patent Laid-Open Publication No. 2000-299779 to embed data (code etc.) into image data or sound data is applied to prevent falsification, to prevent fraudulent usage, and to provide additional services. For example, a method to read a digital watermark embedded into a printed material and to display a specified web page is disclosed in U.S. Pat. No. 5,841,978.

An encoding method is disclosed in Japanese Patent Laid-Open Publication No. 2004-349879 in which an image is split into a plurality of blocks, and a difference between average densities of adjacent blocks is used to embed codes into the adjacent block pairs. After the image, which includes the embedded codes, is output to a paper or a display device etc., the image is input by using an input device such as a camera and subjected to a decoding process. In the decoding process, the original codes are decoded from the difference between the average densities of the adjacent blocks of the input image.

In the encoding and decoding method disclosed in Japanese Patent Laid-Open Publication No. 2004-349879, decoding is performed only by using the difference between the average densities of the adjacent blocks of the input image, thereby enabling to enhance the speed of the decoding process. Due to this, a decoder based on the aforementioned decoding method is increasingly mounted on a portable device.

However, in the encoding method disclosed in Japanese Patent Laid-Open Publication No. 2004-349879, color reproduction of the image that is output to a medium such as the paper or the display device is affected due to output characteristics of the output device. Similarly, when the image having the embedded code is read and input from the medium by an input device, grayscale levels of the input image differ from the grayscale levels of the original-image due to input characteristics of the input device. Due to this, values pertaining to the difference between the average densities of the adjacent block pairs in the input image differ from the corresponding values during data embedding, and the original codes cannot be decoded.

Thus, in the encoding method disclosed in Japanese Patent Laid-Open Publication No. 2004-349879, the image having the embedded code needs to be output to a medium, the output image needs to be input from the medium and decoded to determine whether the original codes can be decoded.

SUMMARY OF THE INVENTION

It is an object of the present invention to at least solve the problems in the conventional technology.

An apparatus for determining an availability of encoding data into an image, according to one aspect of the present invention, includes an embedding-availability determining unit that determines the availability based on an input/output characteristic of a predetermined feature amount related to a combination of an output device that outputs an image in which the data is embedded to a medium and an input device that inputs the image that is output to the medium; and a result output unit that outputs a result of determination by the embedding-availability determining unit.

A method of determining an availability of encoding data into an image, according to another aspect of the present invention, includes determining the availability based on an input/output characteristic of a predetermined feature amount related to a combination of an output device that outputs an image in which the data is embedded to a medium and an input device that inputs the image that is output to the medium; and outputting a result of determination at the determining.

A computer-readable recording medium according to still another aspect of the present invention stores a computer program that causes a computer to execute the above method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic for illustrating a density modifying process by a code forming unit;

FIG. 14 is a block diagram of a computer that executes an encoding program according to the first to the fifth embodiments.

DETAILED DESCRIPTION OF THE PREFERRED EMBODIMENTS

Exemplary embodiments of the present invention are explained below in detail with reference to the accompanying drawings. An encoder that embeds codes (binary codes) as data into original image data to generate image data having encoded codes is used to explain the present embodiments.

The encoder according to the present embodiments embeds 16 bit codes eight times into the original image data to generate the image data having the encoded codes. The original image data is image data generated in a predetermined format such as joint photographic expert group (JPEG), graphics interchange format (GIF) etc. and has a size of 1024 by 1024 pixels. The 16 bit codes such as "1010110101001010", for example, are embedded into the original image data.

Figure 1:
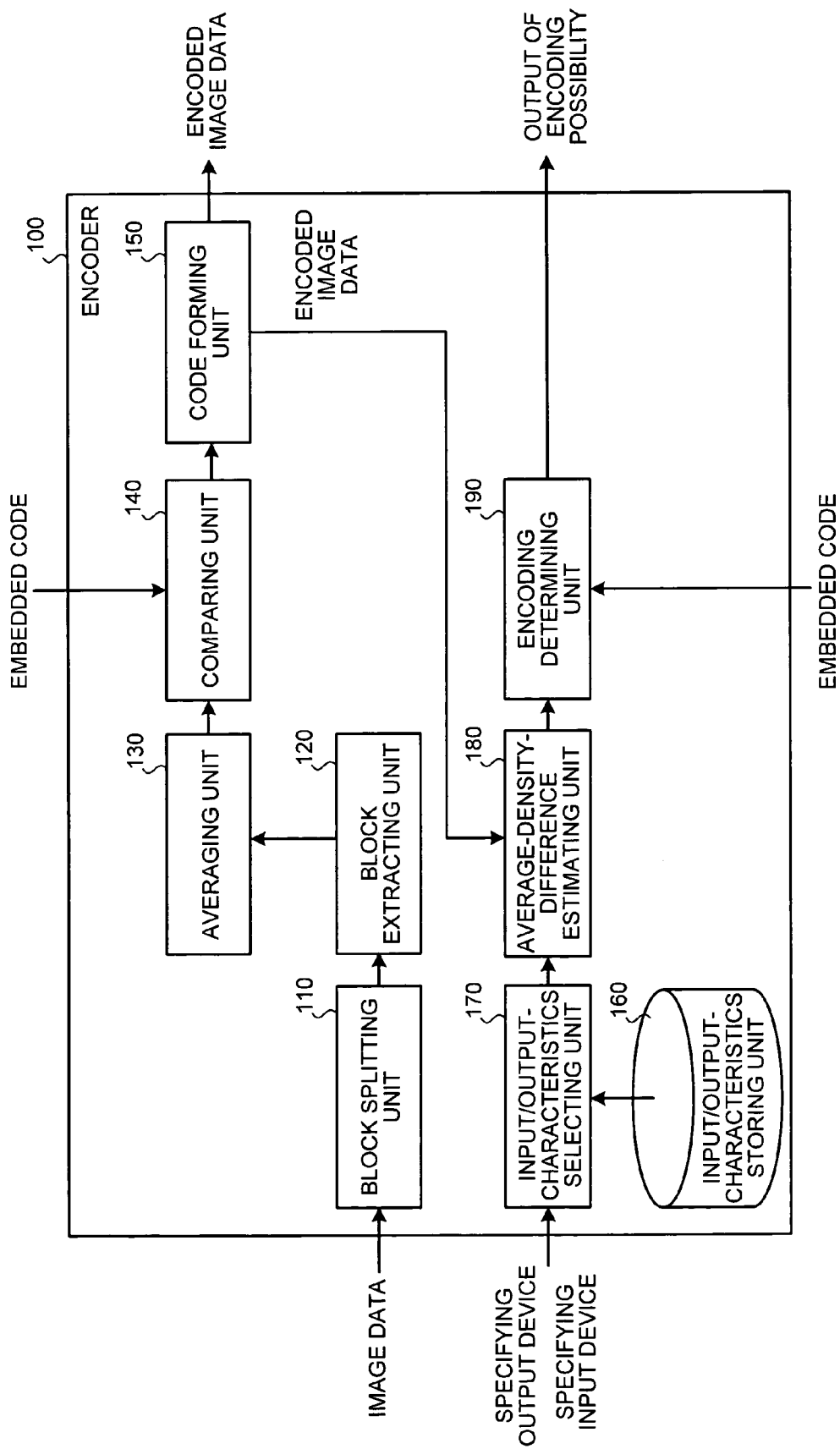
FIG. 1 is a block diagram of an encoder according to a first embodiment of the present invention.

FIG. 1 is a block diagram of an encoder 100 according to a first embodiment of the present invention. The encoder 100 includes a block splitting unit 110, a block extracting unit 120, an averaging unit 130, a comparing unit 140, a code forming unit 150, an input/output-characteristics storing unit 160, an input/output-characteristics selecting unit 170, an average-density-difference estimating unit 180, and an encoding determining unit 190.

Figure 2:
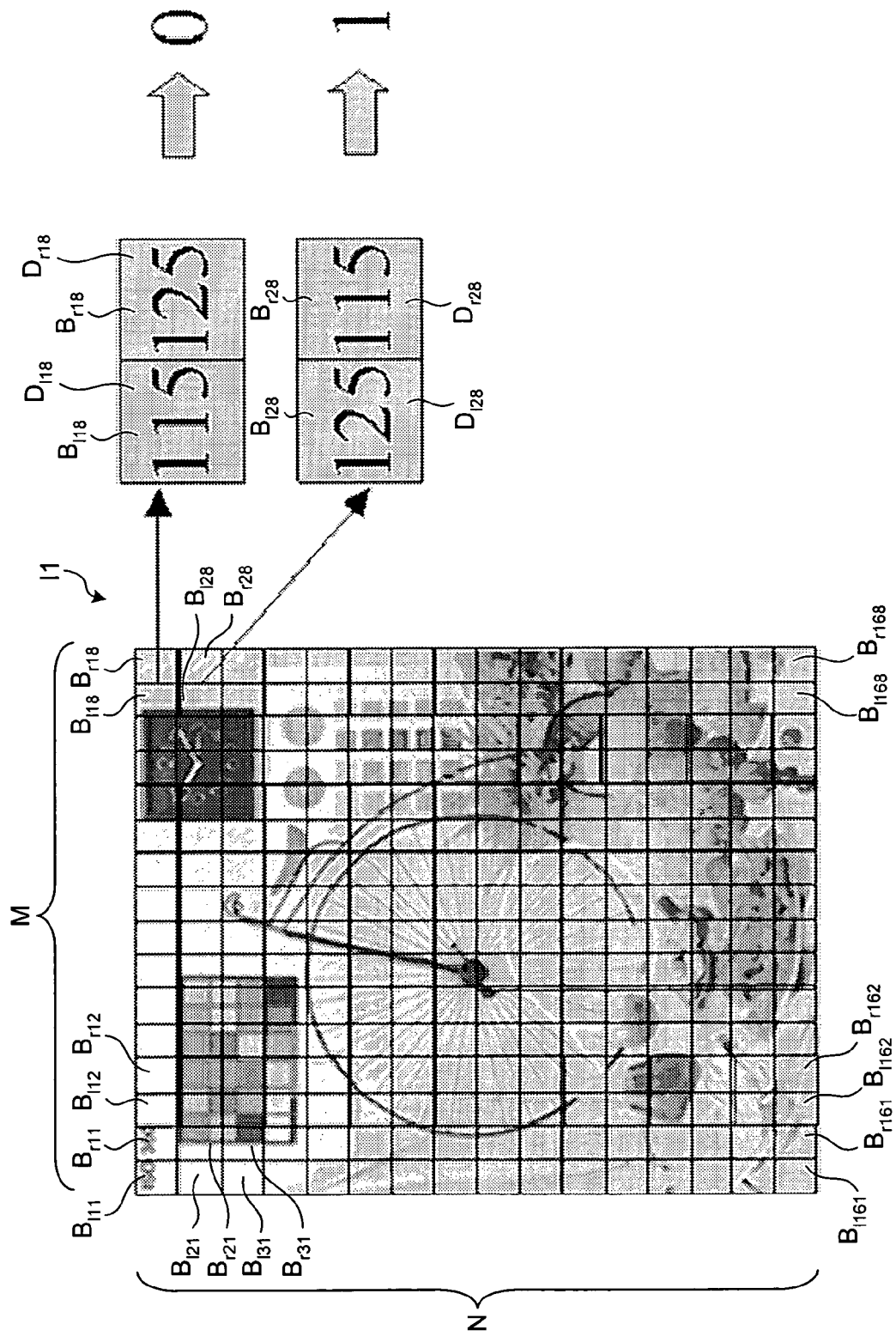
FIG. 2 is a schematic for illustrating an example of block-split image data.

The block splitting unit 110 inputs the original image data, splits the original image data into blocks of N lines and M rows (16 lines and 16 rows in the example according to the first embodiment), and outputs the image data as block-split image data I1. FIG. 2 is a schematic for illustrating an example of the block-split image data I1. The block-split image data I1 includes 256 blocks (16 lines and 16 rows) such as blocks $B_{111}$, $B_{r11}$, ..., $B_{118}$, $B_{r18}$, $B_{121}$, $B_{r21}$, ..., $B_{1168}$, $B_{r168}$ and so on. A single block has a size of 64 by 64 pixels.

In the block-split image data I1, 1 bit code is embedded into a pair block (two adjacent blocks).

The pair blocks are formed of two blocks such as blocks $B_{111}$ and $B_{r11}$, blocks $B_{112}$ and $B_{r12}$, ..., blocks $B_{118}$ and $B_{r18}$ (forming the first line), blocks $B_{121}$ and $B_{r21}$, ..., blocks $B_{128}$ and $B_{r28}$ (forming the second line), ..., blocks $B_{1161}$ and $B_{r161}$, ..., blocks $B_{1168}$ and $B_{r168}$ (forming the sixteenth line).

In a block $B_{1xy}$ of a pair block, a subscript 1 indicates that the block $B_{1xy}$ is a left block, a subscript x indicates a line (N), and a subscript y indicates a row (M). Similarly, in a block $B_{rxy}$ of the pair block, a subscript r indicates that the block $B_{rxy}$ is a right block, a subscript x indicates a line (N), and a subscript y indicates a row (M).

In a pair block, a feature amount in the form of an average density level (average grayscale of each pixel in the block is between 0 and 255) of the left block $B_{1xy}$ is indicated by a left-side average density data $D_1$. An average density level (feature amount) of the right block $B_{rxy}$ is indicated by a right-side average density data $D_r$.

As shown in the following relational expressions, if the left-side average density data $D_1$ is less than the right-side average density data $D_r$, 1 bit code of the pair block is represented as "0". If the left-side average density data $D_1$ is equal to or greater than the right-side average density data $D_r$, 1 bit code of the pair block is represented as "1".

$D_1 < D_r \rightarrow$ "0"

$D_1 \geq D_r \rightarrow$ "1"

For example, in a pair block consisting of blocks $B_{118}$ and $B_{r18}$, because a left-side average density data $D_{118}$ is "115" and a right-side average density data $D_{r18}$ is "125", 1 bit code of the pair block is represented by "0".

Similarly, in a pair block consisting of blocks $B_{128}$ and $B_{r28}$, because a left-side average density data $D_{128}$ is "125" and a right-side average density data $D_{r28}$ is "115", 1 bit code of the pair block is represented by "1".

In the block-split image data I1, because a single line includes eight pair blocks (16 blocks), one line is represented by 8 bit code. Thus, all the lines (16 lines) in the block-split image data I1 are represented by 128 bit codes. In the first embodiment, because codes C, which are embedded into the block-split image data I1 include 16 bits, the codes C can be embedded into the block-split image data I1 a maximum eight times (128 divided by 16).

The block extracting unit 120 sequentially extracts pair blocks (block $B_{1xy}$ and block $B_{rxy}$) according to bit shift of the codes C, and sequentially outputs density distributions of the block $B_{1xy}$ and the block $B_{rxy}$ as block density data D.

Bit shift of the codes C indicates bit by bit shifting of bit pointers of the codes C from a bit at the extreme left (1) towards a bit at the extreme right (0) of the codes C.

The averaging unit 130 calculates the left-side average density data $D_1$, corresponding to the block $B_{1xy}$ and the right-side average density data $D_r$ corresponding to the block $B_{rxy}$ from the block density data D.

The comparing unit 140 compares nth bit of the codes C (such that n=1, 2, 16 beginning from the bit at the extreme left) with a bit determination result that is determined from a magnitude relation between the left-side average density data $D_1$, and the right-side average density data $D_r$ (based on the aforementioned relational expression, bit is determined as "0" or "1").

Based on the comparison result of the comparing unit 140, the code forming unit 150 embeds the codes C into the block-split image data I1 (the original image data). To be specific, if the comparison result of the comparing unit 140 is matching, the code forming unit 150 maintains the magnitude relation between the left-side average density data $D_1$, and the right-side average density data $D_r$. If the comparison result of the comparing unit 140 is not matching, the code forming unit 150 performs a density modifying process to modify (reverse the magnitude relation) the left-side average density data $D_1$, and the right-side average density data $D_r$ such that the magnitude relation between the left-side average density data $D_1$, and the right-side average density data $D_r$ represents bits of the codes C, generates image data having the encoded code (hereinafter, "encoded image data"), and outputs the encoded image data.

FIG. 3 is a schematic for illustrating a density modifying process by the code forming unit 150. In the density modifying process, if $D_1 < D_r$, a left-side average density data $D'_1$ after modification is calculated by using Equation (1), and a right-side average density data $D'_r$ after modification is calculated by using Equation (2). T indicates a level difference between the pair block, and has a value such as "30" for example. Due to this, after density modification, the left-side average density data $D'_1$ becomes smaller than the right-side average density data $D'_r$, and the bit determination result is changed from "1" to "0".

If $D_l \geq D_r$, a left-side average density data $D'_l$ after modification is calculated by using Equation (3), and a right-side average density data $D'_r$ after modification is calculated by using Equation (4). Due to this, after density modification, the left-side average density data $D'_l$ becomes equal to or greater than the right-side average density data $D'_r$, and the bit determination result is changed from "0" to "1".

The input/output-characteristics storing unit 160 stores input/output characteristics related to density for each combination of an output device which outputs an image having embedded code to a medium, and an input device which inputs the image that is output to the medium.

Figure 4A:
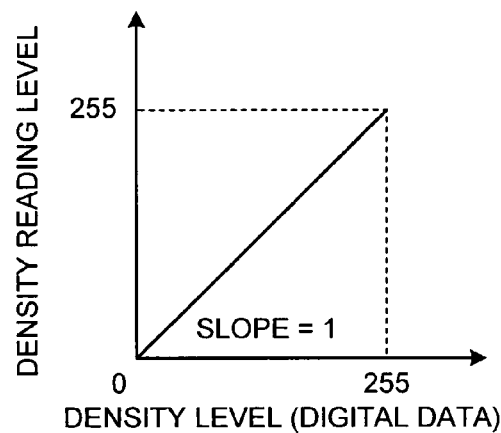
FIG. 4A is a graph of input/output characteristics in an ideal condition.
Figure 4B:
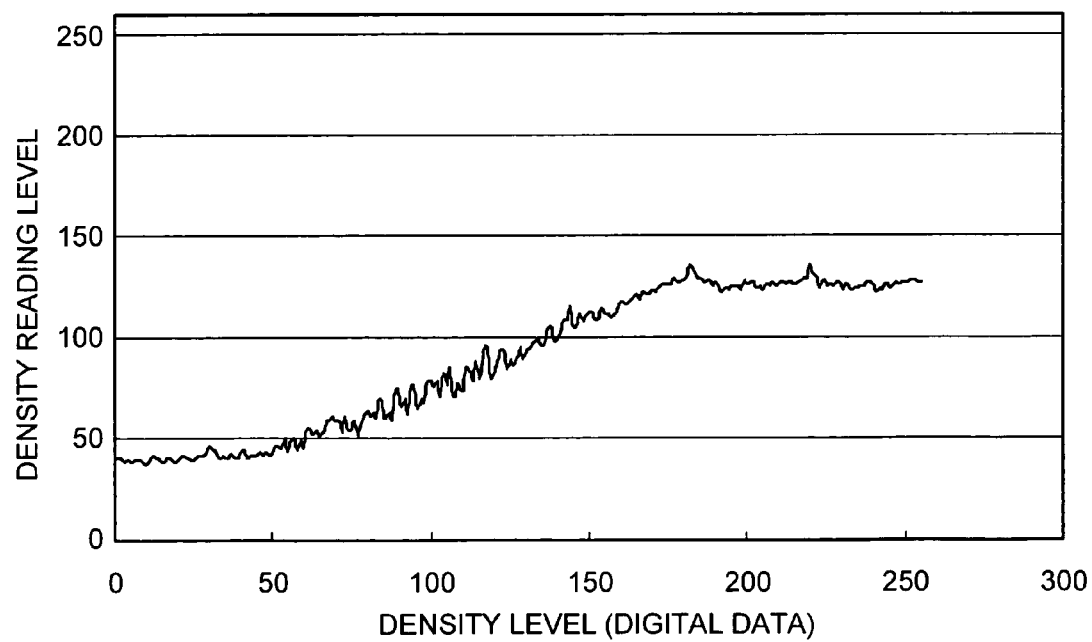
FIG. 4B is a graph of an example of actual input/output characteristics.

FIG. 4A is a graph of input/output characteristics in an ideal condition. FIG. 4B is a graph of an example of actual input/output characteristics. In the ideal condition of input/output characteristics, a density level on a horizontal axis (density level of digital data before output by the output device) is the same as a density level on a vertical axis (density reading level when the image that is output to the medium by the output device is read by the input device), and the input/output characteristics are indicated by a straight line having a slope equal to 1.

However, as shown in FIG. 4b, in the actual input/output characteristics, a difference occurs between the density level on the horizontal axis and the density level on the vertical axis. Especially because in a blind sector, the density level on the vertical axis does not change even if the density level on the horizontal axis changes and the embedded codes cannot be decoded, use of the blind sector needs to be avoided when embedding the codes. The output device outputs a density patch to the medium, and the input device inputs the density patch from the medium, thereby enabling to estimate the input/output characteristics.

The input/output-characteristics selecting unit 170 receives specifications pertaining to the output device and the input device, and reads the input/output characteristics corresponding to a combination of the specified input device and the output device from the input/output-characteristics storing unit 160. The input/output-characteristics selecting unit 170 distributes the read input/output characteristics to the average-density-difference estimating unit 180.

The average-density-difference estimating unit 180 estimates average density difference of pair blocks when the image having the embedded codes is output to the medium and is read by the input device. The average-density-difference estimating unit 180 operates the input/output characteristics that are fetched from the input/output-characteristics selecting unit 170 in the encoded image data that is generated by the code forming unit 150 and calculates the average density difference of the pair blocks when the image is read by the input device.

By using the input/output characteristics, the average-density-difference estimating unit 180 estimates the average density difference of the pair blocks when the image having the embedded codes is output to the medium and read by the input device, thereby enabling to estimate whether the codes can be decoded without actual output of the image to the medium and reading of the image from the medium.

By using the average density difference of the pair blocks estimated by the average-density-difference estimating unit 180, the encoding determining unit 190 determines whether encoding can be performed and outputs the determination result. To be specific, by using the estimated average density difference of the pair blocks, the encoding determining unit 190 compares the decoded codes and the embedded codes, and if the number of accurately decoded codes exceeds a predetermined threshold value, determines that encoding can be performed. If the number of accurately decoded codes does not exceed the predetermined threshold value, the encoding determining unit 190 determines that encoding cannot be performed.

Figure 5:
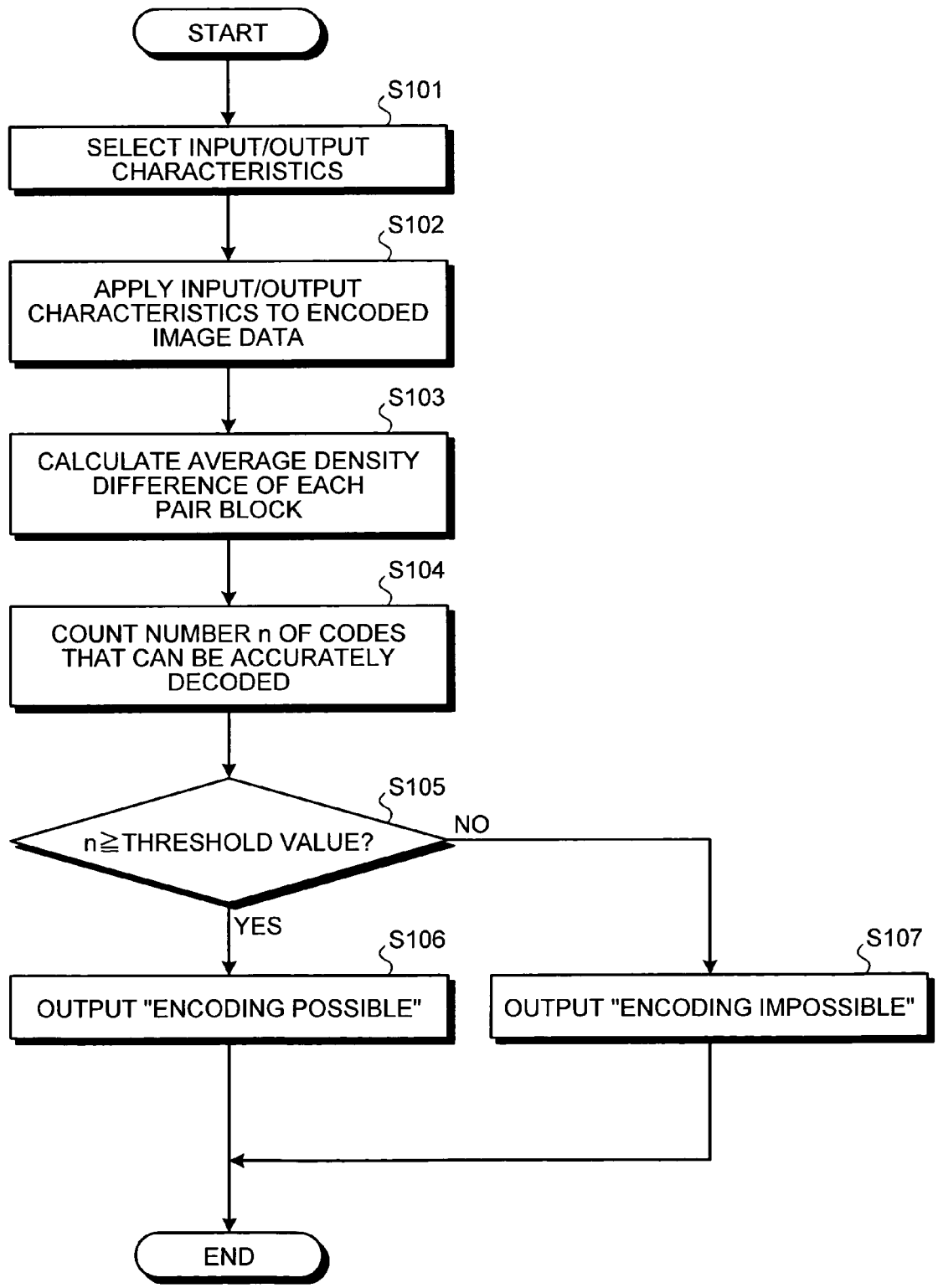
FIG. 5 is a flowchart of a processing procedure for an encoding-availability determining process by the encoder according to the first embodiment.

A sequence of an encoding-availability determining process by the encoder 100 according to the first embodiment is explained next. FIG. 5 is a flowchart of a processing procedure for an encoding-availability determining process by the encoder 100 according to the first embodiment. The encoding-availability determining process is activated after the encoded image data is generated by the code forming unit 150.

In the encoding-availability determining process by the encoder 100, the input/output-characteristics selecting unit 170 receives specifications of the output device and the input device, and by using the input/output-characteristics storing unit 160, selects the input/output characteristics pertaining to the combination of the specified output device and the input device (step S101).

The average-density-difference estimating unit 180 applies the input/output characteristics to the encoded image data (step S102) and calculates the average density difference of each pair block (step S103). The encoding determining unit 190 compares the codes that are decoded from the average density difference of each pair block with the embedded codes to count a number n of the codes that can be accurately decoded (step S104) and determines whether n is equal to or greater than the predetermined threshold value (step S105).

If n is equal to or greater than the predetermined threshold value, the encoding determining unit 190 outputs "encoding possible" (step S106), and if n is smaller than the predetermined threshold value, the encoding determining unit 190 outputs "encoding impossible" (step S107).

Thus, the encoder 100 operates the input/output characteristics in the encoded image data, calculates the average density difference of each pair block, and based on the average density difference, estimates the number of accurately decoded codes, thereby enabling to determine whether encoding can be performed.

In the encoding-availability determining process, the encoder 100 counts a number n of the codes that can be accurately decoded and determines that encoding can be performed if n is equal to or greater than the predetermined threshold value. However, making the predetermined threshold value equal to the number of embedded codes enables to set a condition that encoding can be performed only if all the codes can be accurately decoded.

As described above, according to the first embodiment, the input/output-characteristics storing unit 160 stores the input/output characteristics for multiple combinations of the input device and the output device, the input/output-characteristics selecting unit 170 receives specifications of the input device and the output device and selects the input/output characteristics corresponding to the specified combination of the input device and the output device from the input/output-characteristics storing unit 160. The average-density-difference estimating unit 180 operates the input/output characteristics in the encoded image data that is generated by the code forming unit 150 and calculates the average density difference of each pair block. Based on the average density difference calculated by the average-density-difference estimating unit 180, the encoding determining unit 190 estimates the number of codes that are accurately decoded to determine whether encoding can be performed, thereby enabling to determine whether encoding can be performed without the need to actually read and decode the image from a medium after the encoded image is output to the medium.

When using a mobile phone to read an image printed on a paper, decoding needs to be performed by using the mobile phone having the worst input characteristics from various types of mobile phones. An encoder according to a second embodiment of the present invention selects the worst input/output characteristics from the input/output characteristics when each of multiple input devices is separately combined with the output device and operates the selected input/output characteristics in the encoded image data.

Figure 6:
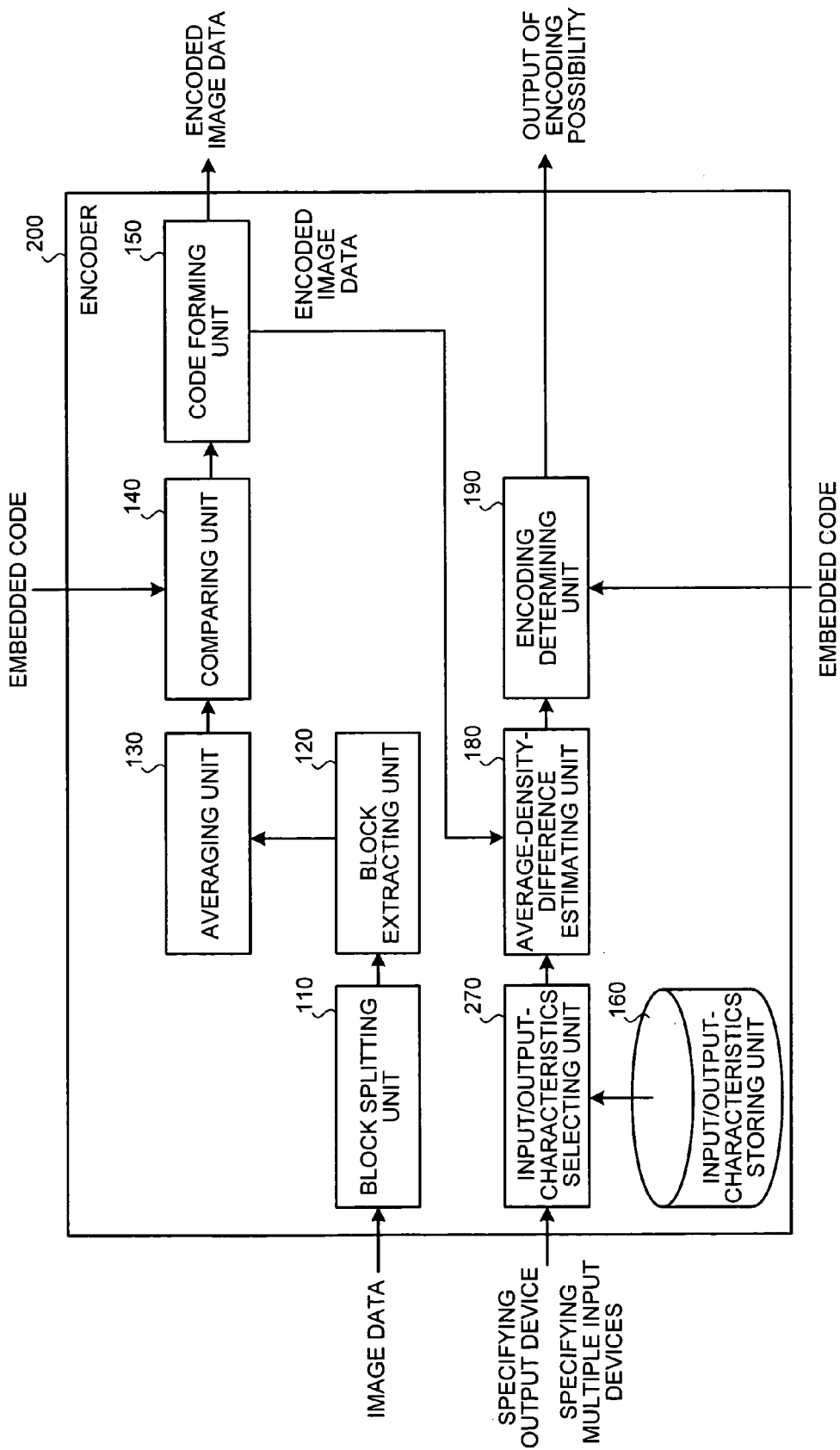
FIG. 6 is a block diagram of an encoder according to a second embodiment of the present invention.

FIG. 6 is a block diagram of an encoder 200 according to the second embodiment. For the sake of convenience, units performing similar functions as the units shown in FIG. 2 are indicated by the same reference numerals, and the detailed explanation is omitted. The encoder 200 includes an input/output-characteristics selecting unit 270 instead of the input/output-characteristics selecting unit 170 shown in FIG. 2.

The input/output-characteristics selecting unit 270 receives specifications of the output device and multiple input devices, reads the input/output characteristics corresponding to the combinations of the output device with each of the input devices from the input/output-characteristics storing unit 160, and selects the worst input/output characteristics from the read input/output characteristics.

Figure 7:
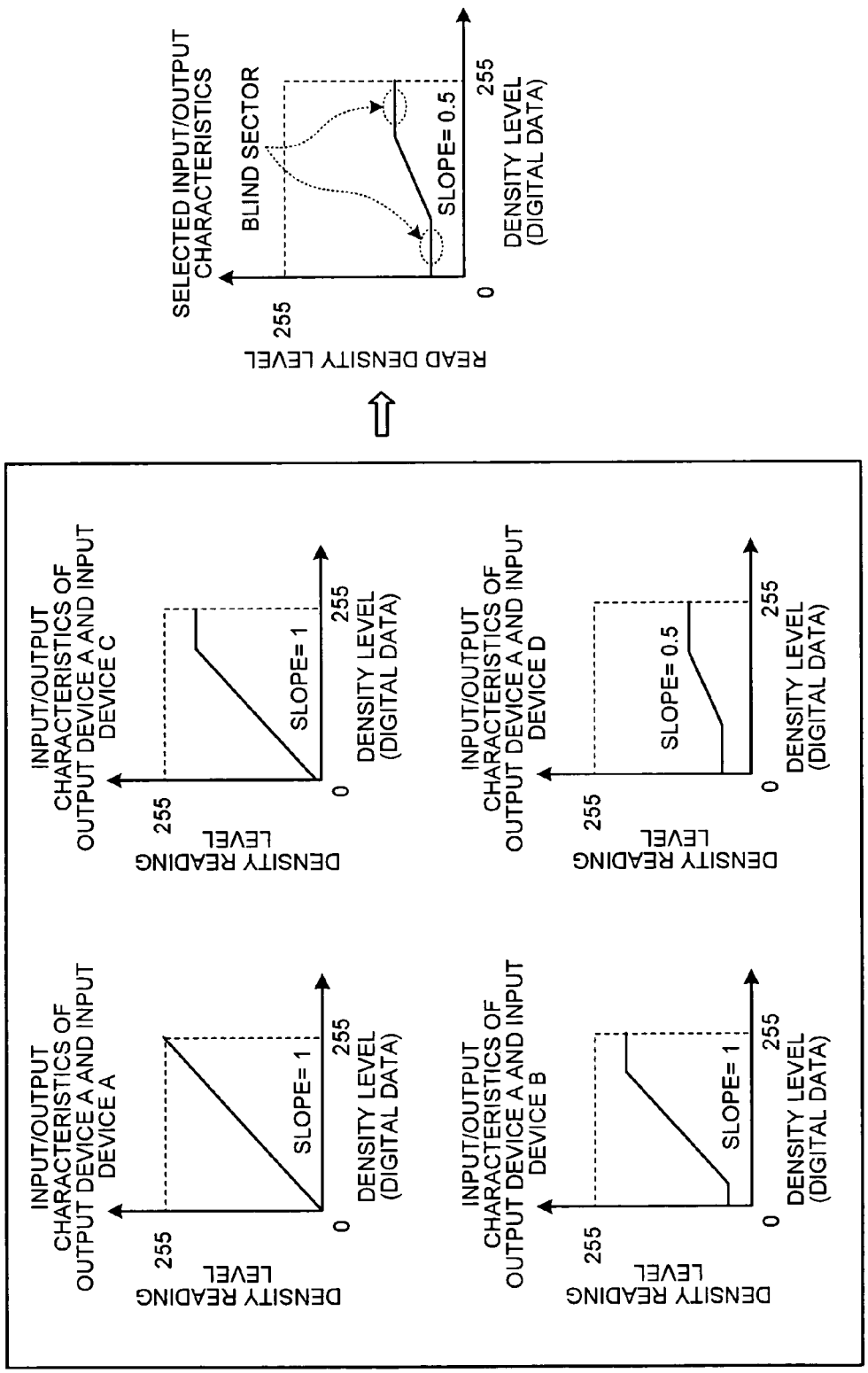
FIG. 7 is a schematic for illustrating an example of selection of the input/output characteristics by an input/output-characteristics selecting unit.

FIG. 7 is a schematic for illustrating an example of selection of the input/output characteristics by the input/output-characteristics selecting unit 270. The input/output-characteristics selecting unit 270, selects the input/output characteristics from four input/output characteristics when each of four input devices A through D is combined with an output device A. In the example shown in FIG. 7, because the input/output characteristics pertaining to a combination of the output device A with the input device D are the worst, the input/output-characteristics selecting unit 270 selects the input/output characteristics pertaining to the combination of the output device A with the input device D.

According to the second embodiment, the input/output-characteristics selecting unit 270 receives specifications of the output device and multiple input devices, and selects the worst input/output characteristics from the input/output characteristics pertaining to combinations of the output device with each of the input devices, thereby enabling to perform encoding with guaranteed decoding performance even when multiple input devices are used.

The encoder can also be construed such that the encoder receives specifications of multiple output devices and a single input device, or specifications of multiple output devices and multiple input devices, and selects the worst input/output characteristics.

The encoders according to the first and the second embodiments apply the input/output characteristics to the encoded image data, calculates the average density difference of each pair block, and based on the average density difference, compares decoding result of the codes with the embedded codes to determine whether encoding can be performed. However, the encoder can also determine whether encoding can be performed only from the calculated average density difference without comparing the decoding result with the embedded codes. An encoder according to a third embodiment of the present invention determines whether encoding can be performed only from the calculated average density difference without comparing the decoding result with the embedded codes.

Figure 8:
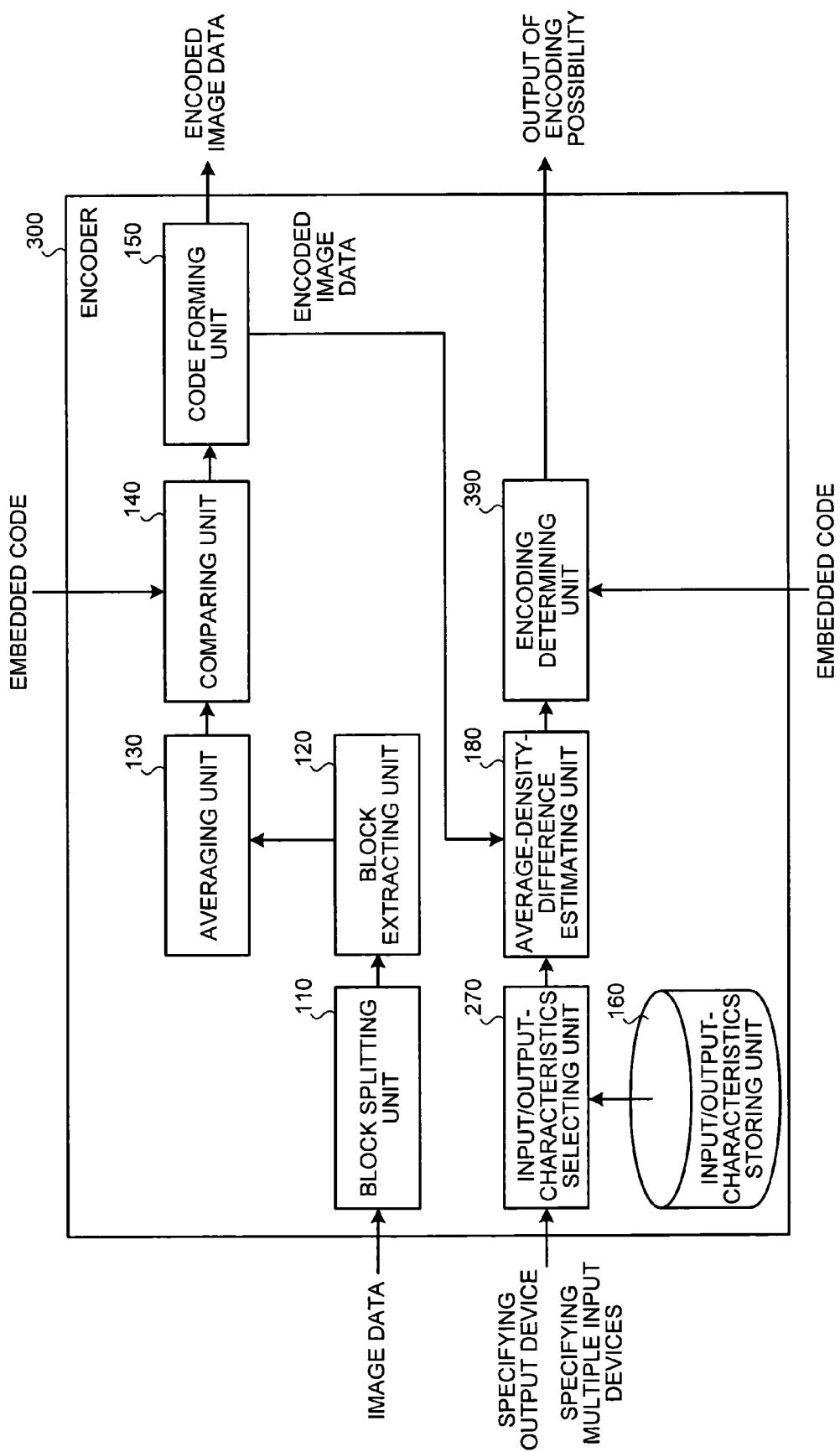
FIG. 8 is a block diagram of an encoder according to a third embodiment of the present invention.

FIG. 8 is a block diagram of an encoder 300 according to the third embodiment. For the sake of convenience, units performing similar functions as the units shown in FIG. 6 are indicated by the same reference numerals, and the detailed explanation is omitted. The encoder 300 includes an encoding determining unit 390 instead of the encoding determining unit 190 of the encoder 200.

The encoding determining unit 390 determines whether encoding can be performed only from the average density difference, which is estimated by the average-density-difference estimating unit 180, of the pair blocks and outputs the determination result. If the number of pair blocks having a predetermined average density difference is equal to or greater than a predetermined threshold value, the encoding determining unit 390 determines that encoding can be performed. If the number of pair blocks having the predetermined average density difference is smaller than the predetermined threshold value, the encoding determining unit 390 determines that encoding cannot be performed.

Figure 9:
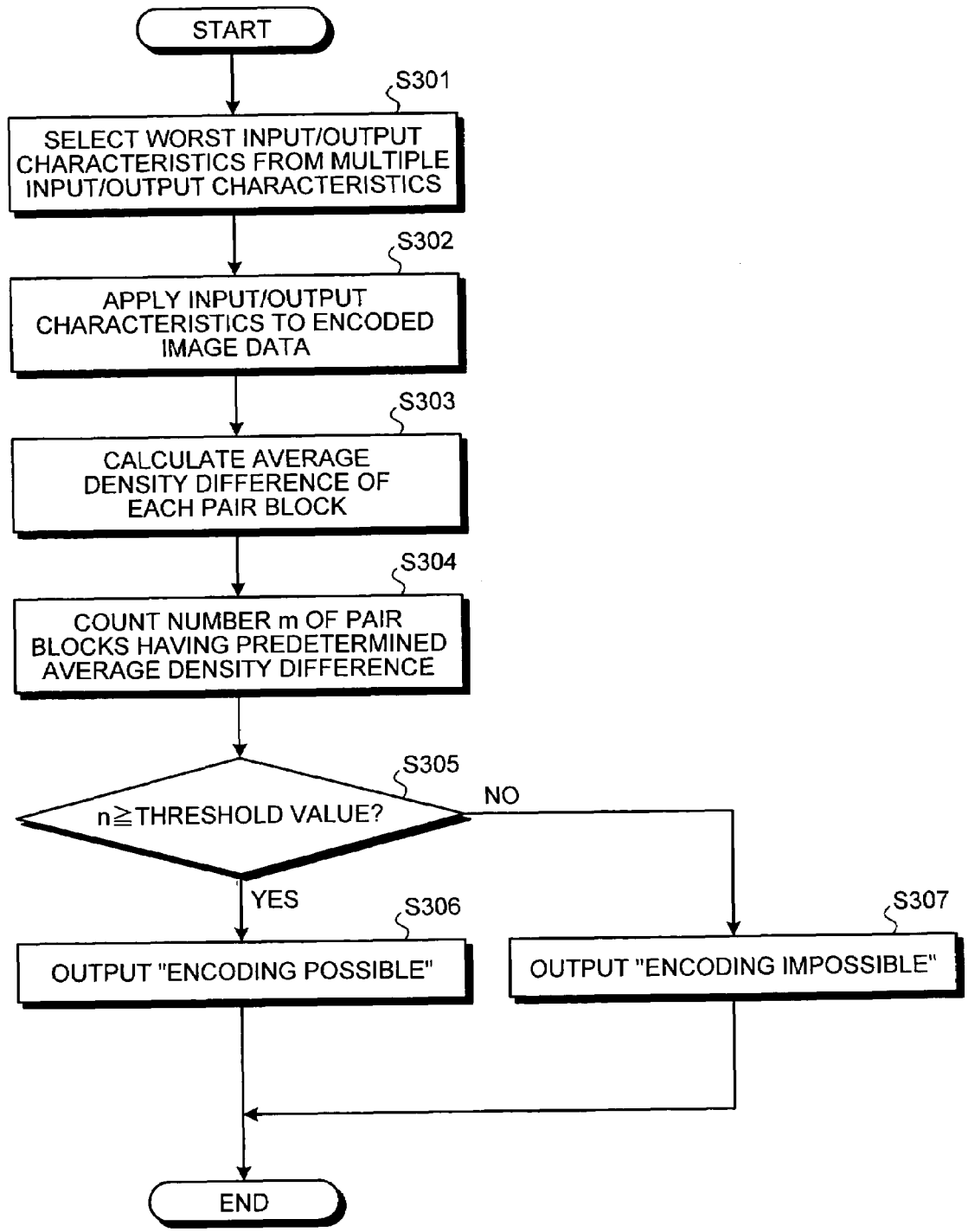
FIG. 9 is a flowchart of a processing procedure for an encoding-availability determining process by the encoder according to the third embodiment.

FIG. 9 is a flowchart of a processing procedure for an encoding-availability determining process by the encoder 300 according to the third embodiment. In the encoding-availability determining process by the encoder 300, the input/output-characteristics selecting unit 270 receives specifications of the output device and multiple input devices, and selects the worst input/output characteristics from the input/output characteristics corresponding to the combinations of the specified output device and each of the input devices (step S301).

The average-density-difference estimating unit 180 operates the input/output characteristics in the encoded image data (step S302), and calculates the average density difference of each pair block (step S303). The encoding determining unit 390 counts a number m of the pair blocks having the predetermined average density difference from the average density difference of each pair block (step S304), and determines whether m is equal to or greater than the predetermined threshold value (step S305).

If m is equal to or greater than the predetermined threshold value, the encoding determining unit 390 outputs "encoding possible" (step S306). If n is smaller than the predetermined threshold value, the encoding determining unit 390 outputs "encoding impossible" (step S307).

Thus, the encoding determining unit 390 counts the number of the pair blocks having the predetermined average density difference from the average density difference of each pair block, thereby enabling to determine whether encoding can be performed.

According to the third embodiment, the encoding determining unit 390 of the encoder 300 counts the number m of the pair blocks having the predetermined average density difference from the average density difference of each pair block, and based on whether m is equal to or greater than the predetermined threshold value, determines whether encoding can be performed, thereby enabling to determine whether encoding can be performed without using the embedded data.

The encoder according to the third embodiment applies the input/output characteristics to the encoded image data to calculate the average density difference of each block pair, and based on the number of pair blocks having the predetermined average density difference determines whether encoding can be performed. However, the encoder can also determine whether encoding can be performed without operating the input/output characteristics in the encoded image data. An encoder according to a fourth embodiment of the present invention determines whether encoding can be performed without operating the input/output characteristics in the encoded image data.

Figure 10:
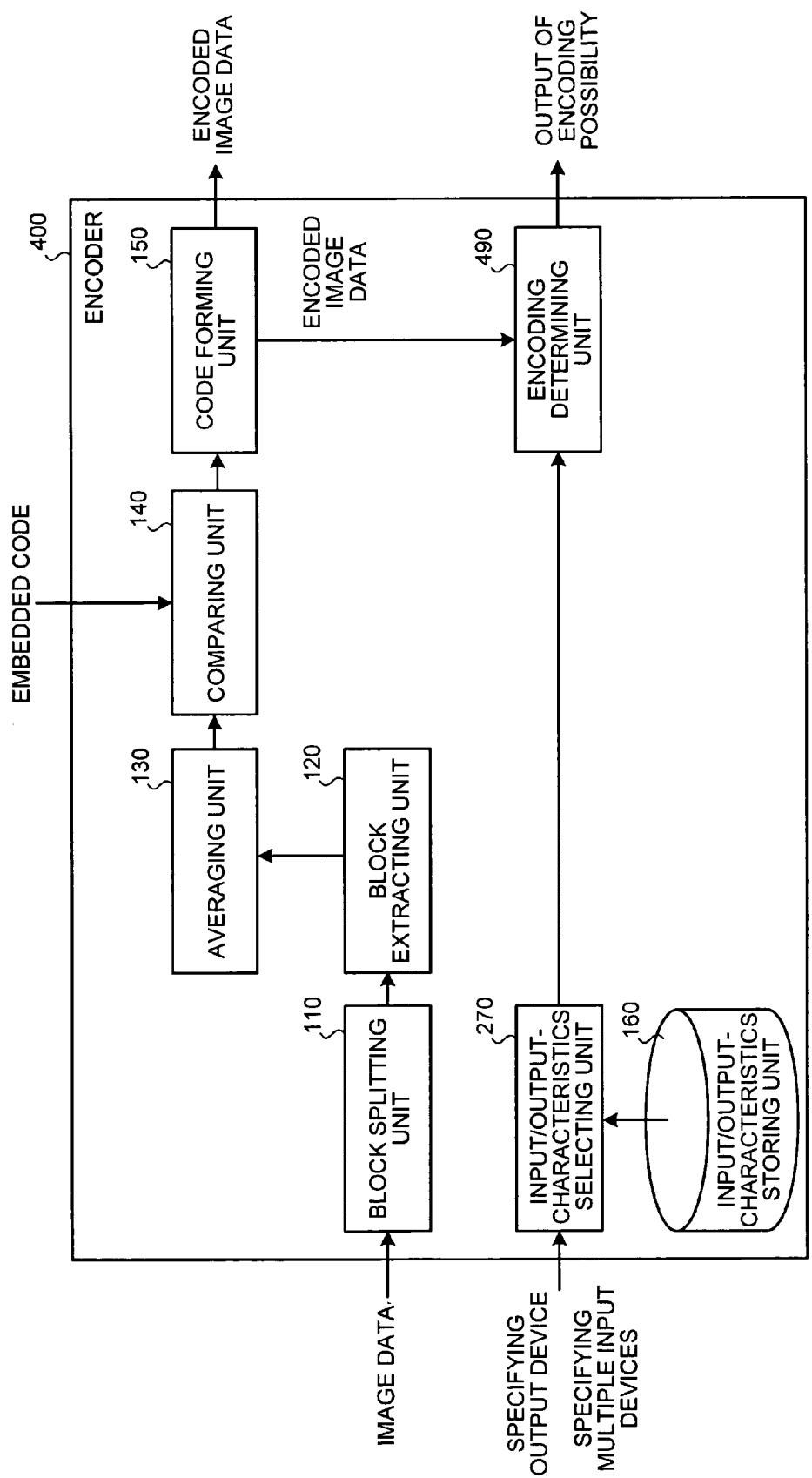
FIG. 10 is a block diagram of an encoder according to a fourth embodiment of the present invention.

FIG. 10 is a block diagram of an encoder 400 according to the fourth embodiment. For the sake of convenience, units performing similar functions as the units shown in FIG. 6 are indicated by the same reference numerals, and the detailed explanation is omitted. The encoder 400 includes an encoding determining unit 490 instead of the encoding determining unit 190 shown in FIG. 6, and the average-density-difference estimating unit 180 is removed.

The encoding determining unit 490 of the encoder 400 fetches the encoded image data from the code forming unit 150, and based on a number of pair blocks in the blind sector of the input/output characteristics that are selected by the input/output-characteristics selecting unit 270, determines whether encoding can be performed. The encoding determining unit 490 determines that a pair block is in the blind sector if at least one block of the pair block is in the blind sector.

Figure 11:
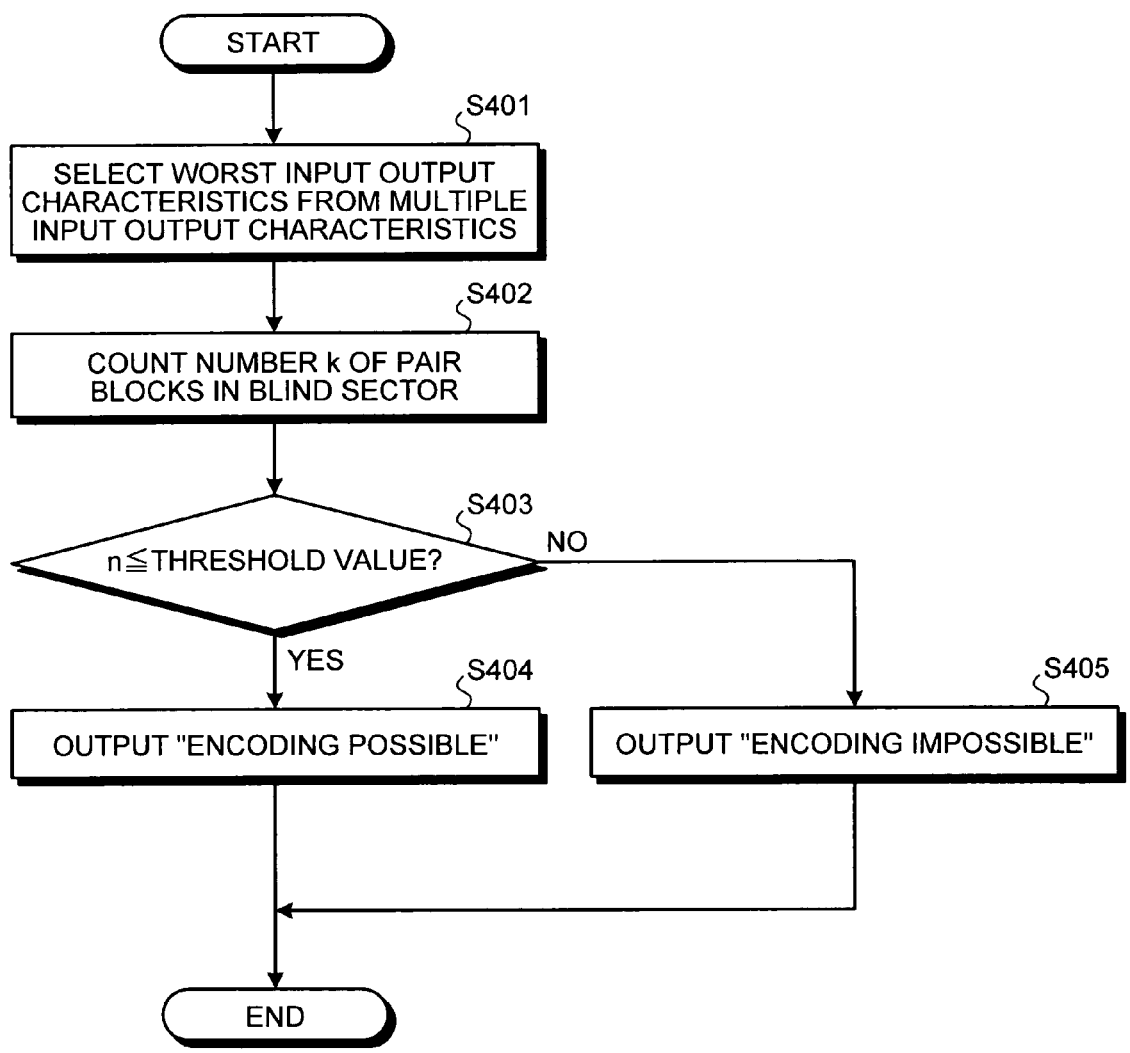
FIG. 11 is a flowchart of a processing procedure for an encoding-availability determining process by the encoder according to the fourth embodiment.

FIG. 11 is a flowchart of a processing procedure for an encoding-availability determining process by the encoder 400 according to the fourth embodiment. In the encoding-availability determining process, the input/output-characteristics selecting unit 270 of the encoder 400 receives specifications of the output device and multiple input devices, and selects the worst input/output characteristics from the input/output characteristics corresponding to the combinations of the specified output device and each of the input devices (step S401).

The encoding determining unit 490 counts a number k of the pair blocks in the blind sector of the input/output characteristics (step S402), and determines whether k is equal to or greater than a predetermined threshold value (step S403).

If k is equal to or smaller than the predetermined threshold value, the encoding determining unit 490 outputs "encoding possible" (step S404), and if k is greater than the predetermined threshold value, the encoding determining unit 490 outputs "encoding impossible" (step S405).

Thus, by counting the number of pair blocks in the blind sector of the input/output characteristics from the encoded image data, the encoding determining unit 490 can determine whether encoding can be performed.

According to the fourth embodiment, the encoding determining unit 490 of the encoder 400 counts the number k of the pair blocks in the blind sector of the input/output characteristics from the pair blocks of the encoded image data, and based on whether k is equal to or smaller than the predetermined threshold value, determines whether encoding can be performed, thereby enabling to determine whether encoding can be performed without operating the input/output characteristics in the encoded image data.

The encoder according to the first to the fourth embodiments determines whether encoding can be performed for the encoded image data and outputs the determination result. However, based on the determination result of whether encoding can be performed, the embedding process of the codes can also be improved. An encoder according to a fifth embodiment of the present invention improves the embedding process of the codes based on the determination result of whether encoding can be performed.

Figure 12:
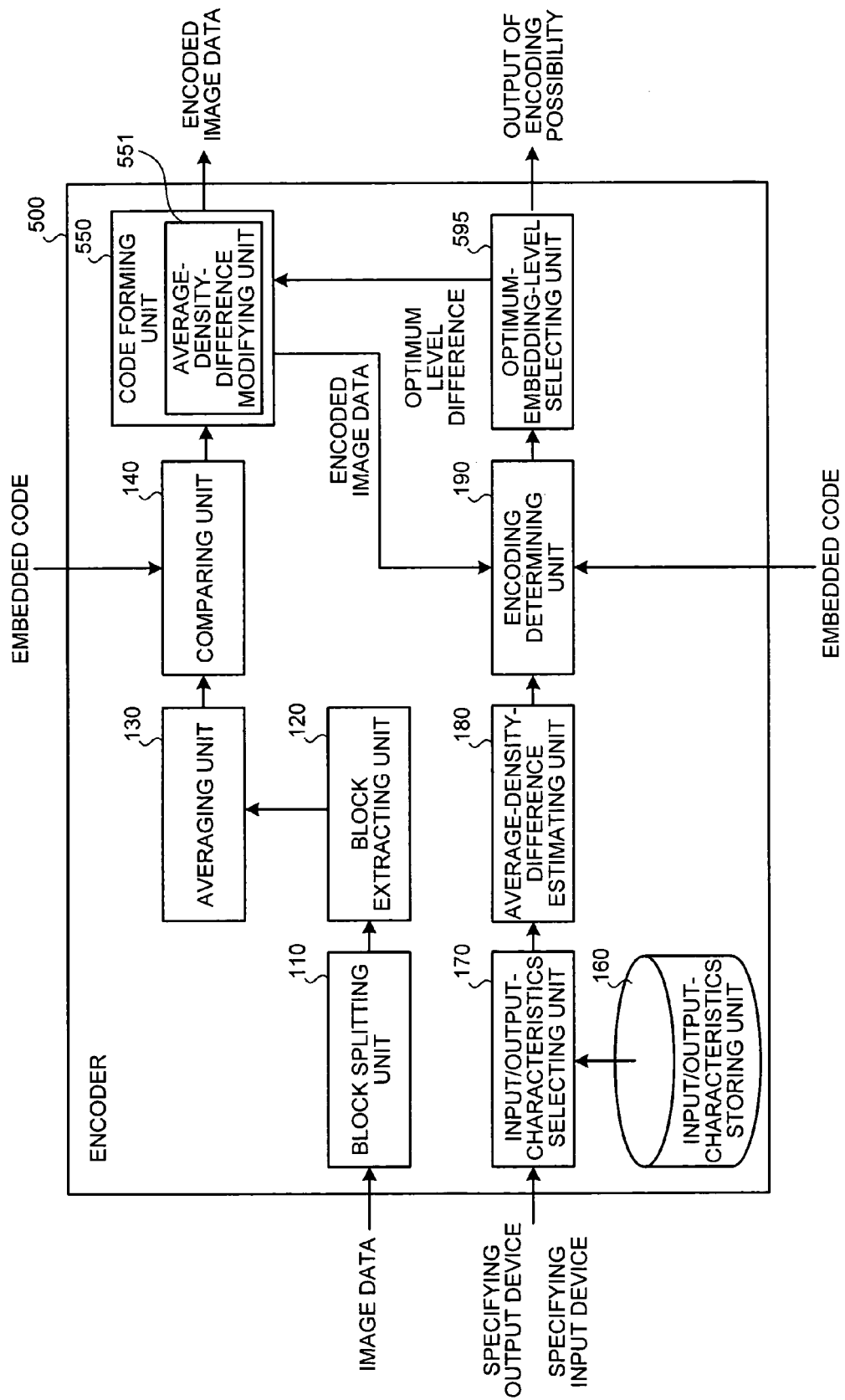
FIG. 12 is a block diagram of an encoder according to a fifth embodiment of the present invention.

FIG. 12 is a block diagram of an encoder 500 according to the fifth embodiment. For the sake of convenience, units performing similar functions as the units shown in FIG. 2 are indicated by the same reference numerals, and the detailed explanation is omitted. The encoder 500 includes a code forming unit 550 instead of the code forming unit 150 shown in FIG. 2, and also includes an optimum-embedding-level selecting unit 595 as a new unit.

The optimum-embedding-level selecting unit 595 fetches from the encoding determining unit 190 the determination result of whether encoding can be performed, and based on the determination result, selects an optimum value T pertaining to level difference that is maintained between the average densities of a block pair during the density modifying process. The optimum-embedding-level selecting unit 595 distributes the optimum value T to the code forming unit 550.

If the determination result indicates that encoding can be performed, based on the input/output characteristics, the optimum-embedding-level selecting unit 595 selects the minimum value of level difference T that enables encoding. In other words, when the encoder 500 operates the input/output characteristics in the encoded image data to calculate the average density difference of each block pair and counts the number n of the codes that are accurately decoded, the optimum-embedding-level selecting unit 595 selects the minimum possible value for the level difference T such that n is equal to or greater than the threshold value to enable encoding.

If the determination result indicates that encoding cannot be performed, based on the input/output characteristics, the optimum-embedding-level selecting unit 595 selects the level difference T that is necessary to enable encoding. In other words, when the encoder 500 operates the input/output characteristics in the encoded image data to calculate the average density difference of each block pair and counts the number n of the codes that are accurately decoded, the optimum-embedding-level selecting unit 595 selects the level difference T such that the value of n increases from being less than the threshold value to being equal to or greater than the threshold value to enable encoding.

Based on the determination result by the encoding determining unit 190 pertaining to whether encoding can be performed, the optimum-embedding-level selecting unit 595 selects the optimum level difference, thereby enabling the code forming unit 550 to perform an optimum density modifying process.

By using the optimum level difference selected by the optimum-embedding-level selecting unit 595, the code forming unit 550 embeds the code again. In other words, by using the optimum level difference, an average density difference modifying unit 551 of the code forming unit 550 modifies the average densities of blocks in a block pair to embed codes.

Figure 13:
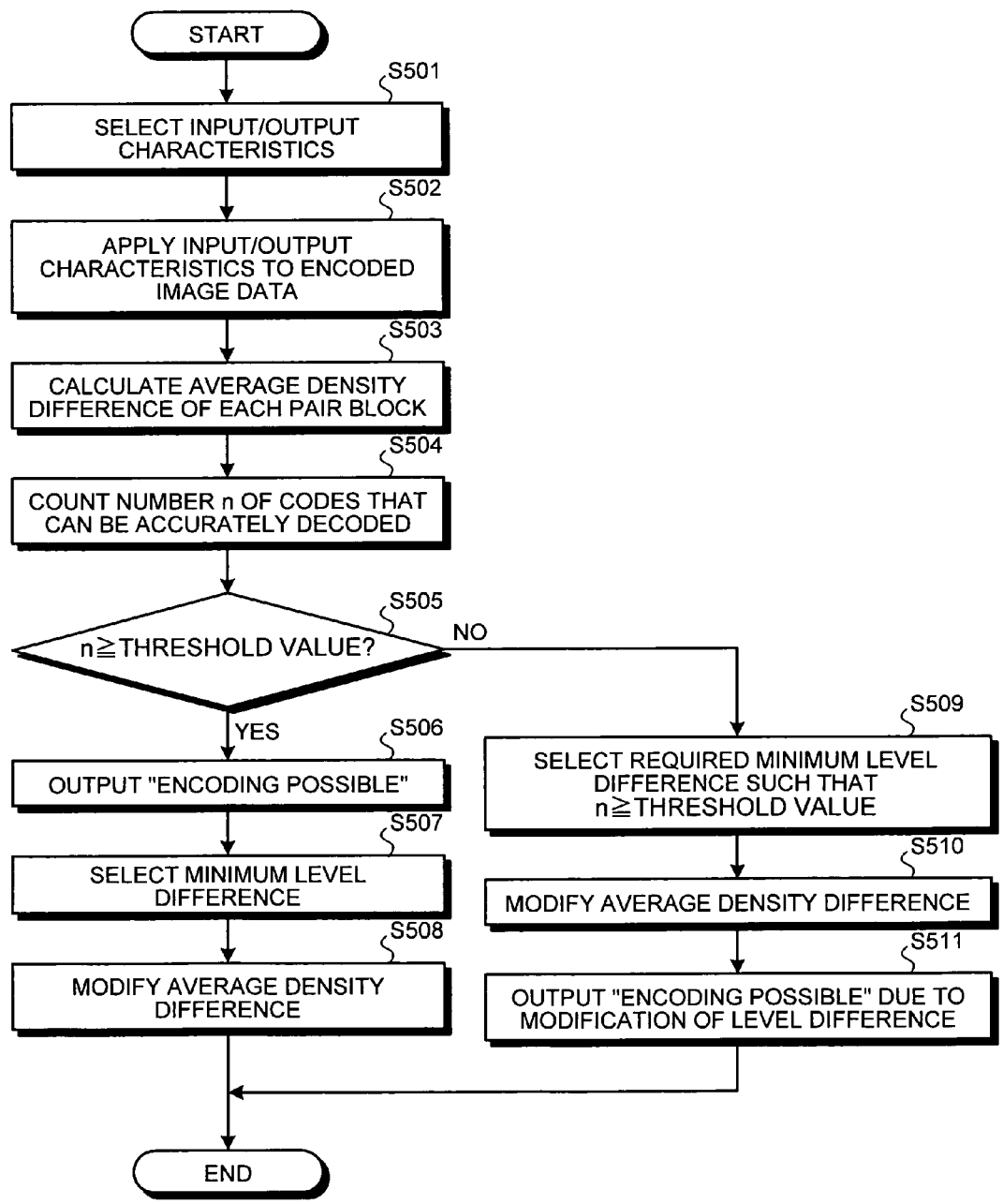
FIG. 13 is a flowchart of a processing procedure for an encoding-availability determining process by the encoder according to the fifth embodiment.

FIG. 13 is a flowchart of a processing procedure for an encoding-availability determining process by the encoder 500 according to the fifth embodiment.

Because the sequence indicated by steps S501 through S506 of FIG. 13 is similar to the sequence indicated by steps S101 through S106 of the encoding-availability determining process by the encoder 100 shown in FIG. 5, only steps S507 through S511 of FIG. 13 are explained.

After the encoding determining unit 190 of the encoder 500 outputs "encoding possible" at step S506, the optimum-embedding-level selecting unit 595 selects the minimum level difference (step S507), and the code forming unit 550 uses the minimum level difference to modify the average density difference again (step S508).

If the number n of the codes that can be accurately decoded is smaller than the threshold value ("No" at step S505), the optimum-embedding-level selecting unit 595 selects the minimum level difference that is necessary to ensure that n is equal to or greater than the threshold value (step S510), and the code forming unit 550 uses the level difference selected by the optimum-embedding-level selecting unit 595 to modify the average density difference again (step S511). Next, the encoder 500 outputs "encoding possible" due to modification of level difference by the optimum-embedding-level selecting unit 595 (step S512) and ends the encoding-availability determining process.

According to the fifth embodiment, based on the determination result by the encoding determining unit 190 pertaining to whether encoding can be performed, the optimum-embedding-level selecting unit 595 of the encoder 500 selects the optimum level difference and the code forming unit 550 uses the optimum level difference to embed the codes again, thereby enabling to perform encoding while guaranteeing decoding performance and minimizing deterioration of image quality.

The encoder 500 that combines the encoding determining unit 190 and the optimum-embedding-level selecting unit 595 is explained in the fifth embodiment. However, instead of the encoding determining unit 190, the encoding determining unit 390 explained in the third embodiment or the encoding determining unit 490 explained in the fourth embodiment can also be combined with the optimum-embedding-level selecting unit 595.

In the encoder 500, the optimum-embedding-level selecting unit 595 selects the optimum level difference, and the code forming unit 550 uses the optimum level difference to embed the codes again. However, the encoder can also be construed in which selection of the level difference by the optimum-embedding-level selecting unit 595 and encoding by the code forming unit 550 is repeatedly performed to get the optimum encoding result.

An encoder is explained according to the first to the fifth embodiments. However, the present invention is not to be thus limited, and can be similarly applied to an encoding-availability determining apparatus that determines whether encoding can be performed from the input/output characteristics for the encoded image data that is generated by the code forming unit 150.

An encoder that uses average density is explained according to the first to the fifth embodiments. However, the present invention is not to be thus limited, and can be similarly applied to an encoder that uses other feature quantities related to image such as amount of granulation, color saturation, density equilibrium, dispersion etc.

An encoder that uses the average density difference between the pair blocks is explained according to the first to the fifth embodiments. However, the present invention is not to be thus limited, and can be similarly applied to an encoder that uses the average density difference of other combinations of blocks.

An encoder is explained according to the first to the fifth embodiments. However, a structure of the encoder can also be realized by using software to get an encoding program having similar functions or an encoding-availability determining program as a part of the encoding program.

FIG. 14 is a block diagram of a computer 600 that executes an encoding program according to the first to the fifth embodiments. The computer 600 includes a random access memory (RAM) 610, a central processing unit (CPU) 620, a hard disk drive (HDD) 630, a local-area-network (LAN) interface 640, an input/output interface 650, and a digital-versatile-disk (DVD) drive 660.

The RAM 610 stores programs and results during execution of programs etc. The CPU 620 reads the programs from the RAM 610 and executes the read programs.

The HDD 630 is a disk device that stores programs and data. The LAN interface 640 connects the computer 600 to other computers via LAN.

The input/output interface 650 connects input devices such as a mouse, a keyboard etc. and output devices such as a display device, a printer etc. The DVD drive 660 performs read/write operations on a DVD.

An encoding program 611, which is executed by the computer 600, is stored in the DVD, read from the DVD by the DVD drive 660, and installed in the computer 600.

The encoding program 611 can also be stored in a database of another computer system that is connected to the computer 600 via the LAN interface 640, read from the database and installed in the computer 600.

The encoding program 611 is stored in the HDD 630, read by the RAM 610, and executed by the CPU 620 as an encoding process 621.

According to the present invention, it is possible to determine whether encoding can be performed without actually examining whether data can be extracted from the image by inputting the image from a medium after the image having encoded data is output to the medium.

Furthermore, according to the present invention, it is possible to determine whether encoding can be performed without actually examining whether data can be extracted from the image by inputting the image from the medium after the image having encoded data is output to the medium.

Moreover, according to the present invention, it is possible to determine whether encoding can be performed without actually examining whether data can be extracted from the image by inputting the image from the medium after the image having encoded data is output to the medium.

Furthermore, according to the present invention, it is possible to guarantee decoding performance for all the multiple input devices.

Moreover, according to the present invention, it is possible to perform optimum data embedding while guaranteeing decoding performance.

Furthermore, according to the present invention, it is possible to perform optimum data embedding while guaranteeing decoding performance.

Moreover, according to the present invention, it is possible to perform optimum data embedding while guaranteeing decoding performance.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for determining an availability of encoding data into an image, the apparatus comprising:
   an input/output characteristic applying unit that applies an input/output characteristic of a feature amount, the input/output characteristic being related to a combination of an output device and an input device, to an image in which the data is embedded using the feature amount, wherein the output device outputs the image in which the data is embedded to a medium, and the input device inputs the image;
   an embedding-availability determining unit that determines an availability of embedding the data in the image, without outputting the image in which the data is embedded to the medium, using the image to which the input/output characteristic is applied by the input/output characteristic applying unit; and
   a result output unit that outputs a result of determining the availability by the embedding-availability determining unit.

2. The apparatus according to claim 1, wherein
   the embedding-availability determining unit determines the availability based on whether the feature amount that is obtained by applying the input/output characteristic to the image in which the data is embedded satisfies a predetermined condition.

3. The apparatus according to claim 1, wherein
the embedding-availability determining unit determines the availability based on a fraction of a partial image pertaining to a blind sector for the input/output characteristic from among the image in which the data is embedded.

4. The apparatus according to claim 1, wherein
a plurality of input devices is provided, and
the embedding-availability determining unit determines the availability based on a worst input/output characteristic from among a plurality of input/output characteristics obtained by combining the output device with each of the input devices.

5. The apparatus according to claim 1, further comprising:
an embedding unit that splits the image into a plurality of blocks, and embeds the data into the image based on a difference between feature amounts of adjacent blocks; and
an optimum-value selecting unit that selects an optimum value of the difference based on the determination by the embedding-availability determining unit, wherein
the embedding unit re-embeds the data into the image by using the selected optimum value.

6. The apparatus according to claim 5, wherein
the optimum-value selecting unit selects, when the embedding-availability determining unit determines that the embedding is available, a minimum value of the difference with which the embedding-availability determining unit can determine that the embedding is possible, as the optimum value.

7. The apparatus according to claim 5, wherein
the optimum-value selecting unit selects, when the embedding-availability determining unit determines that the embedding is unavailable, a required minimum value of the difference with which the embedding-availability determining unit can determine that the embedding is possible, as the optimum value.

8. A computer-implemented method of determining an availability of encoding data into an image, the method comprising:
applying an input/output characteristic of a feature amount, the input/output characteristic being related to a combination of an output device and an input device, to an image in which the data is embedded using the feature amount, wherein the output device outputs the image in which the data is embedded to a medium and the input device inputs the image;
determining an availability of embedding the data in the image, without outputting the image in which the data is embedded to the medium, using the image to which the input/output characteristic is applied at the applying; and
outputting a result of determination at the determining.

9. The method according to claim 8, wherein
the determining includes determining the availability based on whether the feature amount that is obtained by applying the input/output characteristic to the image in which the data is embedded satisfies a predetermined condition.

10. The method according to claim 8, wherein
the determining includes determining the availability based on a fraction of a partial image pertaining to a blind sector for the input/output characteristic from among the image in which the data is embedded.

11. The method according to claim 8, wherein
a plurality of input devices is provided, and
the determining includes determining the availability based on a worst input/output characteristic from among a plurality of input/output characteristics obtained by combining the output device with each of the input devices.

12. The method according to claim 8, further comprising:
splitting the image into a plurality of blocks;
embedding the data into the image based on a difference between feature amounts of adjacent blocks; and
selecting an optimum value of the difference based on the determination at the determining, wherein
the embedding includes re-embedding the data into the image by using the selected optimum value.

13. The method according to claim 12, wherein
the selecting includes selecting, when it is determined that the embedding is available, a minimum value of the difference with which it can be determined that the embedding is possible at the determining, as the optimum value.

14. The method according to claim 12, wherein
the selecting includes selecting, when it is determined that the embedding is unavailable, a required minimum value of the difference with which it can be determined that the embedding is possible at the determining, as the optimum value.

15. A computer-readable recording medium that stores a computer program for determining an availability of encoding data into an image, wherein
the computer program causes a computer to execute:
applying input/output characteristic of a feature amount, the input/output characteristic being related to a combination of an output device and an input device, to an image in which the data is embedded using the feature amount, wherein the output device outputs the image in which the data is embedded to a medium and the input device inputs the image;
determining an availability of embedding the data in the image, without outputting the image in which the data is embedded to the medium, using the image to which the input/output characteristic is applied at the applying; and
outputting a result of the determining.

16. The computer-readable recording medium according to claim 15, wherein
the determining includes determining the availability based on whether the feature amount that is obtained by applying the input/output characteristic to the image in which the data is embedded satisfies a predetermined condition.

17. The computer-readable recording medium according to claim 15, wherein
the determining includes determining the availability based on a fraction of a partial image pertaining to a blind sector for the input/output characteristic from among the image in which the data is embedded.

18. The computer-readable recording medium according to claim 15, wherein
a plurality of input devices is provided, and
the determining includes determining the availability based on a worst input/output characteristic from among a plurality of input/output characteristics obtained by combining the output device with each of the input devices.

19. The computer-readable recording medium according to claim 15, wherein the computer program further causes the computer to execute:
splitting the image into a plurality of blocks;
embedding the data into the image based on a difference between feature amounts of adjacent blocks; and
selecting an optimum value of the difference based on the determination at the determining, wherein
the embedding includes re-embedding the data into the image by using the selected optimum value.

20. The computer-readable recording medium according to claim 19, wherein
the selecting includes selecting, when it is determined that the embedding is available, a minimum value of the difference with which it can be determined that the embedding is possible at the determining, as the optimum value.

* * * * *

UNITED STATES PATENT AND TRADEMARK OFFICE
CERTIFICATE OF CORRECTION

PATENT NO. : 7,676,056 B2
APPLICATION NO. : 11/320937
DATED : March 9, 2010
INVENTOR(S) : Hirotaka Chiba Page 1 of 1

It is certified that error appears in the above-identified patent and that said Letters Patent is hereby corrected as shown below:

Column 13, Line 53, after "of" delete "determination at".

Signed and Sealed this

Twenty-fifth Day of May, 2010

David J. Kappos
*Director of the United States Patent and Trademark Office*